Nov. 8, 1955  F. M. SAYFORD, JR  2,723,072
PAPER COVER AND CONTAINER
Filed March 5, 1952

INVENTOR
F. M. Sayford, Jr.
BY Kimmel & Crowell
ATTORNEYS 2,723,072

PAPER COVER AND CONTAINER

Frank M. Sayford, Jr., Brooklyn, N. Y.

Application March 5, 1952, Serial No. 274,892

1 Claim. (Cl. 229—5.5)

My invention relates to fiberboard or the like paper containers for hot or cold liquids and more especially to the combination of such container with a unique cover or lid, such lid being provided with a simple vent means.

I am not aware of the exact scientific explanation of why the cover or lid I have provided performs its functions in the unique manner hereinafter described and therefore have set forth the same in the form of thories of operation. Structurally, however, the invention may be readily defined and is set forth in detail in the following description and attached drawings. Suffice it to say that I have provided a container of the kind described which is provided with a novel cover structure which may be very readily, quickly and easily applied to the container and serves to seal the contents therein, it being possible not only to stack the filled containers without the lids becoming loose or leaky, but to actually invert the sealed containers without fear of the lid or cover dropping off or becoming detached, and yet when desired the lid or cover may be very readily removed with a simple lifting motion.

Another object of this invention is to provide a lid or cover for a paper container wherein the lid has a taper slightly less than the taper of the container so that the lid or cover will exert its greatest pressure against the container at the inner end of the lid, and the bottom wall of the lid will bow inwardly so that expansion of the bottom wall by absorption of moisture within the cup will tend to exert a sealing force between the lid and container.

A further object of this invention is to provide a lid or cover for a container which upon becoming moist will form a fiber lock between the lid and container so as to normally lock the lid to the container.

With the above and other objects in view, my invention consists in the arrangement, combination and details of construction disclosed in the drawings and specification, and then more particularly pointed out in the appended claim.

Figure 1:
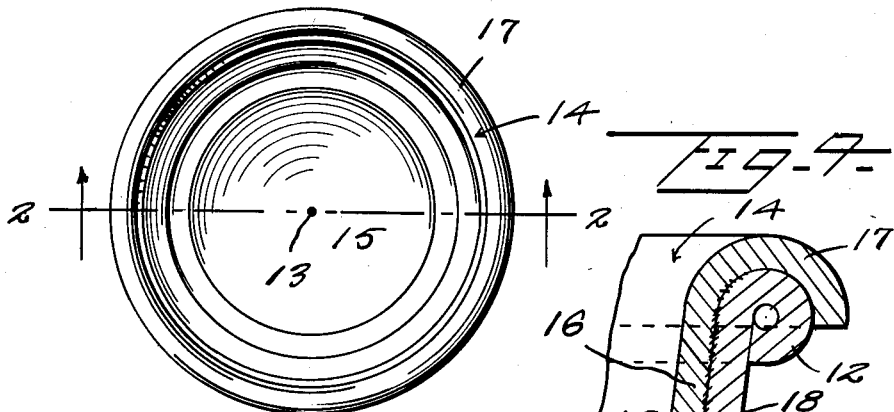
Figure 1 is a plan view of a lid or cover for a container constructed according to an embodiment of this invention.
Figure 4:
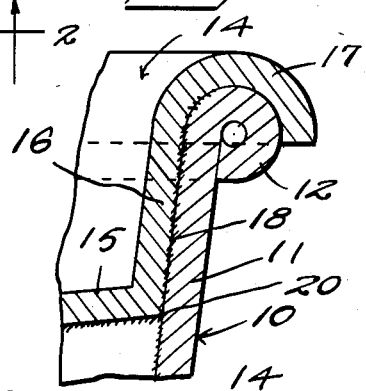
Figure 4 is an enlarged fragmentary sectional view showing the lid in closed position in the container.
Figure 2:
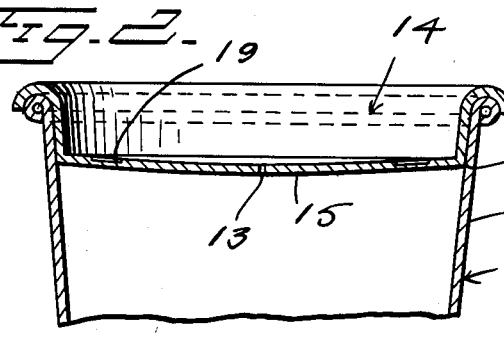
Figure 2 is a fragmentary sectional view taken on the line 2—2 of Figure 1.
Figure 3:
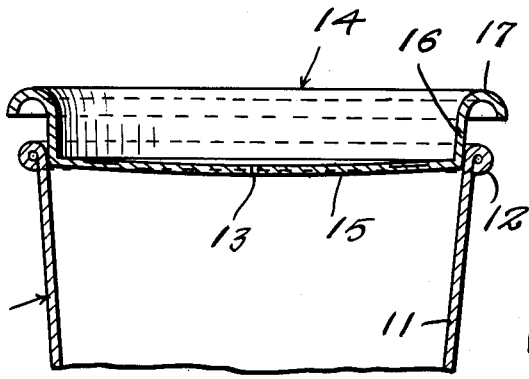
Figure 3 is a view similar to Figure 2 but showing the lid in its initial closing position with respect to the container.
Figure 5:
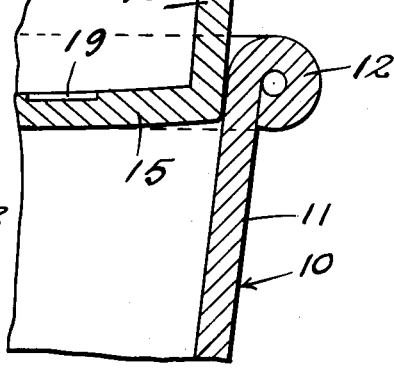
Figure 5 is an enlarged fragmentary sectional view showing the lid in its initial position when being inserted into the container.

Referring to the drawings, the numeral 10 designates generally a tapered container which is formed of fibrous material, such as paper or the like. The container 10 is formed of an inverted frusto conical side wall having a rolled rim 12 at the upper end thereof. A lid or closure generally designated as 14 is adapted to be removably inserted within the upper end of the container 10, and the lid or closure 14 is formed of a disc-shaped bottom wall 15, which is initially bowed downwardly to a slight degree.

The bottom wall 15 has extending from the marginal edge thereof an upwardly tapered side wall 16, the taper of the side wall 16 being slightly less than the taper of the side wall 11 of container 10. The bottom wall 15 is formed with a centrally disposed vent opening 13 so that any vapor or steam within the container 10 may be readily vented to the atmosphere.

The upper edge of the side wall 16 of the lid 14 is formed with a rolled rim 17, which is of semi-circular configuration in cross section so that the rim 17 may snugly seat on the rolled rim 12. The diameter of the bottom wall 15 is substantially equal to the diameter of the side wall 11 in the area of the rolled rim 12 so that when the lid 14 is initially pushed into the container 10, the lower end of the side wall 16 and the marginal edge of the bottom wall 15 will frictionally contact with the inner side of the side wall 11.

As the lid 14 is pressed inwardly into the container 10, the bottom wall 15 will bow downwardly to an additional degree and the side wall 16 will substantially conform to the taper or configuration of side wall 11 of container 10. In this manner the lid 14 is placed under tension due to the bow of the bottom wall 15 and when the inner side of the bottom wall 15 becomes slightly moist, the bottom wall 15 will expand and will, at its marginal edges, press additionally against the side wall 11 of container 10 so as to firmly seal the lid 14 in the container 10.

The construction of the lid 14 and the container 10 is such that the surfaces of these elements exposed to moisture will have the fibers thereof raised, but such moisture and the moisture which moves upwardly between the side walls 11 and 16 by capillary attraction will also raise the surface fibers of the side walls 11 and 16, as indicated at 18, so as to thereby form what is well known as a fiber lock.

This fiber lock will more firmly lock the lid 14 to the container 10 so that no liquid will leak out of the container 10. It has been determined under fluoroscopic examination that moisture will creep upwardly between the contacting side walls 11 and 16 and under a relatively high power microscope, the fiber lock between the lid and the container can be readily viewed.

The upper concave side of the bottom wall 15 is formed with a circular channel or groove 19, which is of a diameter such as to receive the bottom of a superposed container so that closed containers may be readily stacked one upon the other.

The down-turned rim 17 of lid or cover 14 provides a means whereby the rim 12 of container 10 will be kept sanitary or clean and as the edge of rim 17 is substantially free when it is desired to remove the lid 14 from container 10, rim 17 may be distorted and bent upwardly, thereby providing a distorted edge which may be readily grasped by the fingers so as to remove the lid 14 from the container 10.

In the use of this lid and container, the liquid which may be either hot or cold is discharged into the container 10, and the lid 14 is then pressed downwardly in telescopic relation within container 10. The snug seating of the lid within the container serves to additionally bow the bottom wall 15 downwardly so that the latter will exert pressure against the side wall 11 of the container 10 at a point below the upper end or rim 12 of the container. It has been found from practical experiment that when the lid 14 is in applied position with a liquid in container 10, the container may be almost immediately inverted and the pressure exerted by bottom wall 15 and the pressure of side wall 16 of the lid will be sufficient to firmly hold the lid 14 in the container and prevent any leakage of any liquid other than a slight leakage caused by the liquid flowing through the vent opening 13.

When the lid 14 is in its applied position in the container 10 for a relatively short time, the moisture from the liquid will distort or raise the fibers on the bottom surface of the bottom wall 15, and the moisture absorbed by the bottom wall 15 will effect an expanding radially of the bottom wall 15 so as to exert a sealing pressure between the lid 14 and the container 10 at the point indicated at 20. The upward movement of the moisture between the contacting surfaces of the side wall 11 of container 10 and side wall 16 of lid 14 will cause expansion of the respective side walls in opposite directions, in addition to raising the fibers in the confronting surfaces of the side walls so as to thereby form a fiber lock.

I do not mean to confine myself to the exact details of construction herein disclosed, but claim all variations falling within the purview of the appended claim.

What is claimed is:

In combination, a fibrous moisture absorbent cup formed of a uniformly tapered side wall having the large end uppermost, a rolled rim carried by said cup, a fibrous moisture absorbent closure for said cup, said closure being formed of a disc-shaped member, an upwardly and outwardly tapering side wall and an outwardly and downwardly flanged rim projecting from said side wall, said closure side wall having a taper slightly less than the taper of said cup and having an outer diameter adjacent the bottom thereof substantially equal to the inner diameter of the upper terminus of the uniformly tapered wall surface whereby when said closure is in liquid content sealing position said disc-shaped member will be bowed downwardly and the marginal edge of said disc-shaped member will be tightly pressed against the side wall of said cup to cause the side wall of said closure to conform as to the taper thereof to the taper of the side wall of the cup, said side wall will project into said cup a substantial distance below said rim whereby the absorption of moisture from the liquid in said cup by said closure will effect expansion of said disc to increase the pressure thereof against said side wall of said cup, and whereby such moisture by passing by capillary action to said side wall of said closure and said side wall of said cup will raise the surface fibers thereof to form a fiber lock therebetween.

References Cited in the file of this patent

UNITED STATES PATENTS

| | | |
|---|---|---|
| 1,062,542 | Kendrick | May 20, 1913 |
| 1,478,146 | Stevens | Dec. 18, 1923 |
| 1,973,758 | Gray et al. | Sept. 18, 1934 |
| 2,217,619 | Gazette | Oct. 8, 1940 |
| 2,230,877 | Aument | Feb. 4, 1941 |
| 2,350,950 | Wiley | June 6, 1944 |
| 2,582,541 | Harrison | Jan. 15, 1952 |

FOREIGN PATENTS

| | | |
|---|---|---|
| 854,458 | France | Jan. 19, 1940 |
| 978,122 | France | Nov. 22, 1950 |